United States Patent Office

3,432,440
Patented Mar. 11, 1969

3,432,440
EPOXY CURING AGENTS COMPRISING A FLUOBORATE SALT AND A HYDROLYZABLE ESTER
David A. Shimp and Wayne F. McWhorter, Louisville, Ky., and Norman G. Wolfe, New Albany, Ind., assignors to Celanese Coatings Company, a corporation of Delaware
No Drawing. Filed Feb. 11, 1965, Ser. No. 431,974
U.S. Cl. 252—429             4 Claims
Int. Cl. C08g 51/74

---

ABSTRACT OF THE DISCLOSURE

Curing techniques for epoxy resins and new curing agents utilized therein, said curing agents comprising an aqueous solution of a fluoborate salt, carrier vehicle and a hydrolyzable ester of a strong acid.

---

This invention relates to compositions of matter for curing epoxy resins, i.e., curing agents for epoxy resins, and methods of carrying out the curing.

Lewis acid-catalyzed epoxy resin systems of the prior art capable of curing at normal room temperatures have been characterized by an extremely short gel time or working life generally on the order of less than 1 minute. For example, in concentrations suitable for the preparation of usable cured epoxy resins, $BF_3$ diethyl ether complex will cause gelation at room temperature in less than 1 minute. Such short working lives obviously are often disadvantageous.

The present invention utilizes curing agents comprising a fluoborate salt and as an activating agent an acid or a hydrolyzable ester thereof; these curing agents generally provide a gel time ranging from a few minutes to several hours. The acids found to be useful in the present invention are relatively strong, having a pH no higher than about 2 as a 0.1 N aqueous solution at 25° C.; this is not meant to indicate that they are necessarily used in such form but is simply meant to identify these acids in terms of strength; typical such acids are oxalic, sulfurous, orthophosphoric, sulfuric and phosphorous.

Examples of fluoborate salts that may be used are $Zn(BF_4)_2$, $Ni(BF_4)_2$, $Cu(BF_4)_2$ and $Sn(BF_4)_2$. $Zn(BF_4)_2$ and $Ni(BF_4)_2$ are generally preferred because of the clarity and stability of aqueous solutions of these salts in "carrier vehicles" (defined below) when activated by acids or hydrolyzable esters.

It would appear that activation of the fluoborate salt by a relatively strong acid as defined above is an esssential part of the mechanism of operation of the curing agent of the present invention. Also, it would appear that by providing a hydrolyzable ester of the strong acid rather than the strong acid directly, the activation of the fluoborate salt whereby hydrofluoboric acid, $HBF_4$, is released is delayed until the ester hydrolyzes to the extent necessary to produce an adequate amount of the strong acid.

The term "epoxy resin system" as generally used means epoxy resin and curing agent. To facilitate curing according to the present invention when a hydrolyzable ester is employed as the activating agent it is necessary that the epoxy resin system contain some water or, especially in the case of thin films, the necessary water may be absorbed from the atmosphere; the water will serve to hydrolyze the ester. Water in the system may be provided, for example, by using the fluoborate salt in aqueous solution.

Though the particular hydrolyzable ester chosen is not critical, examples of the esters are triphenyl phosphite, diphenyl phosphite, dimethyl hydrogen phosphite, n-butyl acid phosphate, diethyl oxalate, triethyl phosphite, and dimethyl sulfate.

It is particularly useful that the fluoborate salts be dissolved in "carrier vehicles," which are hydroxyl-containing liquids such as polyester alcohols, relatively low molecular weight hydroxyl-terminated polyesters and the like which are miscible with aqueous solutions of the fluoborate salts and are compatible with the epoxy resins.

Essentially any epoxy resin (i.e., having free 1,2-epoxy groups) can be cured according to the present invention, whether or not curable at room temperature. Examples are glycidyl polyethers of polyhydric alcohols or polyhydric phenols, glycidyl esters of carbolic acids, epoxidized fatty acids or drying oils, expoxidized diolefins, epoxidized diunsaturated acid esters, epoxidized polyolefins, epoxidized unsaturated polyesters and the like.

The curing agents of the present invention are particularly useful for curing epoxy resins which are the reaction products in the presence of caustic of bis (4-hydroxyphenyl)-2,2-propane (commonly known as bisphenol A) and epichlorohydrin in a mol ratio of epichlorohydrin to bisphenol A of up to about 10:1.

The invention will now be further illustrated by reference to the following examples in which: "Epoxy Resin X" designates a high purity unmodified liquid resin based on bisphenol A and epichlorohydrin, essentially consisting of about 95% diglycidyl ether of bisphenol A and 5% higher homologs thereof, having an epoxide equivalent weight of 171–177, a viscosity of 77° F. of 3600–5500 centipoises and being water white in color; "Epoxy Resin Y" designates a commercially available grade of the diglycidyl ether of bisphenol A based on bisphenol A and epichlorohydrin, containing about 15% higher homologs, and having an epoxide equivalent weight of 185–200 and a viscosity at 77° F. of 10,000–16,000 centipoises; all proportions in the specification and claims, unless otherwise indicated, are by weight.

EXAMPLE I

A solution of 85 parts by weight of polyethylene glycol of molecular weight 600 (PEG 600), 10 parts by weight of a 40% aqueous solution of zinc fluoborate and 5 parts by weight of triphenyl phosphite is prepared by stirring these materials together at room temperature; this constitutes a curing agent composition. 13 parts of the curing agent composition are blended with 100 parts of Epoxy Resin X. Gelling does not take place until more than 4 hours have elapsed. However, when before blending with the epoxy resin the curing agent composition is heated for a period of 3 hours at 150° F. and cooled to room temperature, a blend of 13 parts of the curing agent composition and 100 parts of Epoxy Resin X cures to a tough thermoset plastic in 13 minutes. If the triphenyl phosphite is omitted from the curing agent, gelation does not occur within a period of 24 hours at temperatures of 70–80° F. The resin when blended with 13 parts of the curing agent composition and cured as a 1/8" thick casting has a hardness of 86 (Shore D), an ultimate tensile strength of 6300–9500 p.s.i., an elongation at break of 1.5–5%, an initial flexural modulus of $0.5 \times 10^6$, an Izod impact strength of 0.8–0.5 ft.-lb./in. notch and a heat distortion temperature of 60–90° C.; (where two figures are given the first is for a cure schedule of 2 weeks at 77° F. and the second is for a cure schedule of 16 hours at 77° F. followed by 2 hours at 212° F.; single figures are for both schedules).

EXAMPLE II

Dimethyl phosphite is used instead of triphenyl phosphite and similar results are attained.

EXAMPLE III

Dimethyl hydrogen phophite is used instead of triphenyl phosphite and similar results are attained.

EXAMPLE IV

N-butyl acid phosphate is used instead of triphenyl phosphite and similar results are attained.

Similarly, using 15 parts of the curing agent composition of Example I, the following resins or resin mixtures are cured.

EXAMPLE V 90 parts Epoxy Resin Y.
10 parts epoxidized linseed oil having an epoxide equivalent weight of 178.

EXAMPLE VI 50 parts Epoxy Resin Y.
50 parts epoxidized linseed oil as identified in Example V.

EXAMPLE VII 100 parts epoxidized linseed oil as identified in Example V.

EXAMPLE VIII 90 parts Epoxy Resin Y.
10 parts epoxidized polybutadiene having an epoxide equivalent weight of 177.

EXAMPLE IX 50 parts Epoxy Resin R.
50 parts epoxidized polybutadiene as identified in Example VIII.

EXAMPLE X 90 parts Epoxy Resin Y.
10 parts vinyl cyclohexene dioxide having an epoxide equivalent weight of 76.

EXAMPLE XI 50 parts Epoxy Resin Y.
50 parts vinyl cyclohexene dioxide as identified in Example X.

EXAMPLE XII 100 parts vinyl cyclohexene dioxide as identified in Example X.

EXAMPLE XIII 90 parts Epoxy Resin Y.
10 parts 3,4-epoxy-6-methylcyclohexylmethyl-3,4-epoxy-6-methylcyclohexane-carboxylate having an epoxide equivalent weight of 157.

EXAMPLE XIV

Same resins as Example XIII but 50 parts of each.

EXAMPLE XV 100 parts of the second listed resin of Example XIII.

EXAMPLE XVI 85 parts of diglycidyl ether of tetrachloro-bisphenol A having an epoxide equivalent weight of 308.
15 parts of monoglycidyl ether of ortho-cresol having an epoxide equivalent weight of 180.

EXAMPLE XVII

Similarly, using 25 parts of the curing composition of Example I, 100 parts of epoxidized polybutadiene as identified in Example IX is cured.

EXAMPLE XVIII

To determine the mechanism by which a solution of 40% aqueous $Zn(BF_4)_2$ dissolved in PEG 600 (i.e., polyethylene glycol having a molecular weight of 600) is activated by the addition of hydrolyzable esters of strong acids the following study is made:

| Parts of PEG 600 | Percent $Zn(BF_4)_2$ as a 40% aqueous solution | Parts of other additives | Gel time at 77° F. of 13 grams of curing agent mixed with 100 grams of epoxy resin Y | |
|---|---|---|---|---|
| | | | No conditioning of curing agent | Curing agent conditioned by heating 2 hours at 150° F., then cooling to 77° F. |
| 85 | 10 | None | No gel overnight | No gel overnight. |
| 85 | 10 | 5-triphenyl phosphite | do | 16 minutes. |
| 85 | 10 | 5-phenol | do | No gel overnight. |
| 85 | 10 | 5-phosphorus acid | 8 minutes | 8 minutes. |
| 85 | 10 | 5-polyphosphoric acid | 4 minutes | 4 minutes. |
| 85 | 10 | 5-diphenyl phosphite | 22 minutes | 20 minutes. |
| 85 | 10 | 5-dimethyl hydrogen phosphite. | No gel overnight | 11 minutes. |
| 85 | 10 | 5-n-butyl acid phosphate | 21 minutes | 18 minutes. |
| 85 | 10 | 5-96% $H_2SO_4$ | 3 minutes | 2 minutes. |
| 90 | | 10-50% aqueous $HBF_4$ | 1.5 minutes | 1.5 minutes. |
| 95 | | 5-phosphorous acid | No gel overnight | No gel overnight. |

From this study it is concluded that fluoborate salts are activated by strong acids which liberate fluoboric acid.

EXAMPLE XIX

The following compositions are mixed and the mixture is found to have a usable pot life of three hours:

Resin portion: G.
  Epoxy resin Y _____ 85
  Triphenyl phosphite _____ 15
Curing agent portion:
  PEG 600 _____ 18
  40% aqueous solution of $Zn(BF_4)_2$ _____ 2

EXAMPLE XX

Various fluoborate salts are found to be useful as follows:

| Composition of Curing Agent blended and reacted for 2 hours at 150° F., then cooled to 71° F. | Appearance | Gel time at room temp. (71-76° F.) of 50 gm. mass of epoxy resin Y and curing agent at conc. of 25 phr. (minutes) | Condition of 50 gm. mass after 1 day at 71°-76° F. |
|---|---|---|---|
| PEG 600, 86% $Ni(BF_4)_2$ at 45% concentration in $H_2O$, 9% triphenyl phosphite, 5%. | Clear, green | 120 | Hard. |
| PEG 600, 86% $Cu(BF_4)_2$ at 45% concentration in $H_2O$, 9% triphenyl phosphite, 5%. | Clear, blue, some copper precipitated. | 9 | Do. |
| PEG 600, 85% $Sn(BF_4)_2$ at 50% concentration in $H_2O$, 10% triphenyl phosphite, 5%. | Cloudy with a white precipitate. | 4 | Do. |
| PEG 600, 85% $Zn(BF_4)_2$ at 40% concentration in $H_2O$, 10% triphenyl phosphite, 5%. | Clear, colorless | 23 | Do. |

EXAMPLE XXI

Various hydrolyzable esters are found to be useful; the hydrolyzable esters are mixed with the Epoxy Resin Y; these mixtures are found to be stable after 1 week at room temperature; the balance of the curing agent (identified as "ECA 60") is added and the system is allowed to cure at room temperature as follows:

| Hydrolyzable ester | Percent of ester added to epoxy resin Y based on total weight of epoxy resin Y and ester | Gel time of 50 gm. mass cured with 20 phr. ECA-60 [1] | Gel time of 1/32" film cured with 20 phr. ECA-60 [1] |
|---|---|---|---|
| Triethyl borate | 10 | >7 hours; hard and tack free within 3 days. | <7 hours; hard with surface tack after 3 days. |
| Diethyl oxalate | 10 | 2 to 5 hours; hard and tack free within 3 days. | Do. |
| Dimethyl hydrogen phosphite. | 10 | 1 to 2 hours (foamed); hard and tack free within 3 days. | <7 hours; hard and tack free after 3 days. |
| Triethyl phosphite | 10 | 1½ to 5½ hours; hard and tack free within 3 days. | Do. |
| Triphenyl phosphite | 15 | ½ to 1½ hours; hard and tack free within 3 days. | Do. |
| Dimethyl sulfate | 10 | 11 hours to 18 hours; hard and tack free within 3 days. | >20 hours; gelled thru in 3 days but sticky surface. |

[1] The composition of ECA-60 is: PPG 400 (Polypropylene glycol having a molecular weight of 400), 89.75%; 40% Zn(BF₄)₂ in water 10.00%; 50% HBF₄ in water 0.25%. The HBF₄ is included only to completely solubilize the Zn(BF₄)₂ and the PPG 400.

It is found that conditioning by temporary heating for a period of from a few minutes to a few hours of a curing agent containing a hydrolyzable ester and an aqueous fluoborate salt solution prior to blending thereof with the epoxy resin results in a shorter cure time since the conditioning by heating accelerates the hydrolysis of the ester; (in Example XX, "reacted" refers to this conditioning).

It is preferred to use from about 0.3 to 3 parts total of fluoborate salt per 100 parts (phr.) of epoxy resin to be cured. It is preferred to use the acid or hydrolyzable ester thereof in a range of about from 0.1 to 1.0 phr. for the acid and about from 0.1 to 100 phr. from the hydrolyzable ester.

It is to be understood that the foregoing detailed description is given merely by way of illustration and that many variations may be made therein without departing from the spirit of the invention.

The embodiments of the invention in which an exclusive property or privilege is claimed are defined as follows:

1. A composition of matter for curing an epoxy resin, said composition of matter comprising an aqueous solution of a fluoborate salt selected from the group consisting of $Zn(BF_4)_2$, $Ni(BF_4)_2$, $Cu(BF_4)_2$ and $Sn(BF_4)_2$, a carrier vehicle which is compatible with said epoxy resin to be cured and in which said aqueous solution of a fluoborate salt is miscible and an ester selected from the group consisting of triphenyl phosphite, diphenyl phosphite, dimethyl hydrogen phosphite, n-butyl acid phosphate, triethyl phosphite, diethyl oxalate and dimethyl sulfate; said fluoborate salt being present in amounts ranging from about 0.3 to about 3 parts per 100 parts epoxy resin to be cured and said ester being present in amounts ranging from about 0.1 to about 100 parts of epoxy resin to be cured.

2. The composition of claim 1 which has been heated to hydrolyze the ester and cooled to room temperature.

3. The composition of claim 2 wherein the carrier vehicle is a glycol selected from the group consisting of polyethylene glycol and polypropylene glycol having a molecular weight in the range from 400 to 600.

4. The composition of claim 2 wherein the glycol is polyethylene glycol having a molecular weight of 600, an aqueous solution of the zinc fluoborate and the ester is triphenyl phosphite.

References Cited

UNITED STATES PATENTS 2,970,983   2/1961   Newey.
3,004,931  10/1961   Brueschweiler et al.

FOREIGN PATENTS 766,273  1/1957   Great Britain.
869,969  6/1961   Great Britain.
903,932  9/1961   Great Britain.

PATRICK P. GARVIN, *Primary Examiner.*

U.S. Cl. X.R.

260—2, 47.